United States Patent [19]

Hanna et al.

[11] 3,899,702
[45] Aug. 12, 1975

[54] TORQUER ARMATURE

[75] Inventors: Samuel C. Hanna, Wyckoff; Walter J. Krupick, Succasana, both of N.J.

[73] Assignee: The Singer Company, Little Falls, N.J.

[22] Filed: Dec. 9, 1971

[21] Appl. No.: 206,465

[52] U.S. Cl. .................................. 310/67; 310/154
[51] Int. Cl. ............................................. H02k 7/00
[58] Field of Search ......... 310/67, 46, 67 A, 49, 68, 310/268, 154, 156, 233, 235

[56] References Cited
UNITED STATES PATENTS

| | | | |
|---|---|---|---|
| 1,464,184 | 8/1923 | Mansbendel | 310/233 |
| 2,638,557 | 5/1953 | Longert | 310/156 |
| 2,861,203 | 11/1958 | Luneau | 310/235 |
| 3,178,599 | 4/1965 | Krupick | 310/154 |
| 3,310,694 | 3/1967 | Hanna | 310/154 |
| 3,483,410 | 12/1969 | Siegelman | 310/154 |

Primary Examiner—R. Skudy
Attorney, Agent, or Firm—T. W. Kennedy

[57] ABSTRACT

A D.C. torquer includes a magnet ring having a longitudinal axis, an armature ring rotatable relative to the magnet ring about the axis, and a commutator ring disposed coaxially with the armature ring and the magnet ring. The magnet ring has a plurality of magnetized poles peripherally spaced about the axis, and has a pair of brushes for engaging the commutator ring. The armature ring has a plurality of coil-wound poles peripherally spaced about the axis, and has a plurality of slots disposed between the poles. The armature poles are separated from the magnet poles by a substantially constant radial gap. The commutator ring is mounted on the armature ring. The armature ring has a ring-shaped web portion and has a ring-shaped flange portion. The armature flange portion has an axial width which is substantially greater than the armature web portion axial width. The magnet ring has an axial width which is approximately equal to the armature flange portion axial width. With this structure and arrangement, the ratio of the magnetic volume of the torquer to the torquer output is minimized.

4 Claims, 4 Drawing Figures

3,899,702

PATENTED AUG 12 1975

SHEET 1

TORQUER ARMATURE

BACKGROUND OF THE INVENTION

The present invention relates to permanent magnet D.C. torquers for gyroscopes, and particularly to a permanent magnet D.C. torquer having a coil-wound armature ring.

A conventional D.C. torquer includes a permanent magnet ring with contact brushes which is mounted on one wall of a housing, and includes a coil-wound armature ring and commutator, which are mounted on another wall of the housing and which is rotatable relative to said first wall and said first permanent magnet. The axial width of the permanent magnet rign is approximately equal to the axial width of the armature ring.

One problem with such a conventional D.C. torquer is the difficulty of increasing the ratio of torque output to power input without increasing the size of the torquer.

In accordance with one embodiment of the present invention, the ratio of torque output to power input for a given torquer size can be improved by using an armature ring having a T-shaped cross section.

Accordingly, it is one object of the present invention to provide a torquer wherein the ratio of torque output to power input for a given torquer size is maximized.

It is another object of the invention to provide a torquer in accordance with the above-described object, wherein the torquer has a magnet ring which is substantially fully saturated.

To the fulfillment of these and other objects, the invention provides a D.C. torquer comprising: a permanent magnet ring having a longitudinal axis, said permanent magnet ring having a plurality of magnetized poles peripherally spaced about said axis, a pair of brushes mounted on said magnet ring; an armature ring rotatable relative to said magnet ring about said axis, said armature ring having a plurality of coil-wound poles peripherally spaced about said axis, said armature ring having a plurality of slots disposed between said poles, said armature poles being separated from said magnet poles by a substantially constant gap; a commutator ring disposed coaxially with said armature ring and said magnet ring, said commutator ring being mounted on said armature ring; wherein said armature ring has a ring-shaped web portion and has a ring-shaped flange portion, said armature web portion and said armature flange portion having respective selected axial widths, said armature flange portion axial width being substantially greater than said armature web portion axial width, and wherein said magnet ring has a selected axial width, said magnet ring axial width being substantially greater than said armature web portion axial width and being approximately equal to said armature flange portion axial width.

Other objects of the invention will become apparent upon reading the annexed detailed description in connection with the drawings, wherein like parts are designated by like numerals throughout the several views, and wherein.

Figure 1:
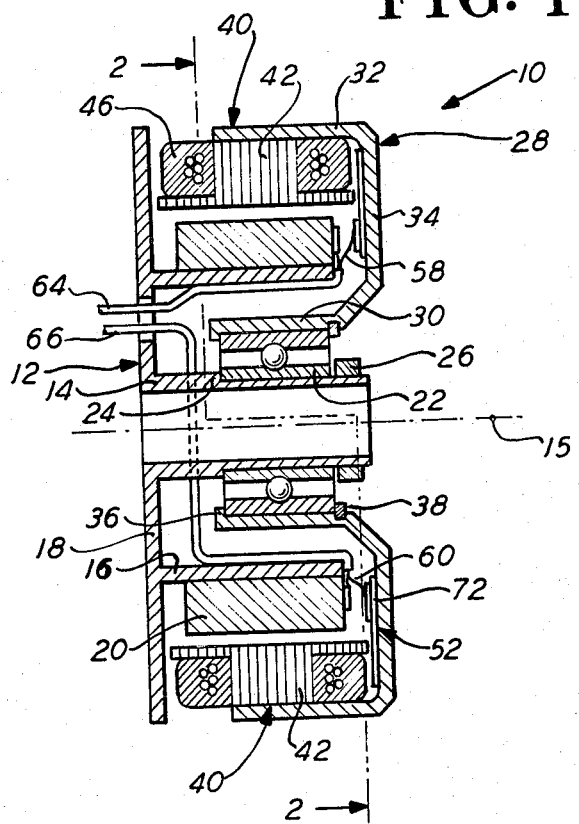
FIG. 1 is a sectional view of a D.C. torquer embodying features of the present invention.

Referring to the drawings, one embodiment of the present invention is a torquer 10. Torquer 10 comprises a stationary support member 12, which has a plurality of magnets 20 and a pair of brushes 58, 60, and comprises a housing 28, which is rotatable relative to member 12 and which has an armature 40 with a commutator 52. The torquer of this general type is described in U.S. Pat. No. 3,310,694, which is assigned to the same assignee as this invention. Torquer 10 is preferably a D.C. permanent magnet torquer.

Support member 12, which is composed of a permeable material has an inner cylindrical wall 14 having an axis 15, and has a coaxial, outer, cylindrical, return-path wall 16, and has a coaxial, washer-shaped end wall 18.

Magnets 20, which are permanent-type magnets, and which are supported on wall 12, are mounted on the radially outer side of wall 16. There is shown twelve magnets in embodiment 10 forming a 12-pole magnet subassembly. Wall 14 has a concentric bearing 22, which is clamped between a shoulder 24 on wall 14 and its adjacent bearing nut 26.

Rotatable housing 28 is supported by wall 12 and bearing 22. Housing 28, which is also composed of permeable material, and which is coaxial with stationary support member 12 along axis 15, has an inner cylindrical wall 30, an outer cylindrical wall 32 and a washer-shaped end wall 34. Wall 30 has a lip 36 and has an adjacent nut or snap ring 38 for connecting bearing 22 to wall 30.

Armature 40, which is supported by housing 28, is a wound multi-polar armature, comprising a solid armature ring 42, with a plurality of slots 44, and a plurality of coils 46. Armature 40 of embodiment 10 has forty-nine of said slots 44, and forty-nine of said coils 46, which cooperate with said twelve magnets 20.

Commutator 52 is supported by armature ring 42, and abuts wall 34, and is coaxial with ring 42 along axis 15. Brushes 58, 60, which are supported by magnets 20, are connected to a support ring 62 which is cemented to the axially outer faces of magnets 20. Brush 58 is located at the twelve o'clock position in FIG. 2 and conducts current to commutator 52; and brush 60 is located near to the six o'clock position in FIG. 2 for ease of illustration and conducts current from commutator 52. Brush 58 has a supply lead 64 and brush 60 has a return lead 66. Brushes 58, 60 are preferably spring-supported with silver-graphite contact faces.

Coils 46 are each composed of a plurality of turns of a strand of continuously wound filament wire; and said coils 46 are connected in series. Each coil 46 encircles teeth and overlaps four adjacent coils. End wall 18 has a slot 70 through which leads 64, 66 pass into the housing. Commutator 52, which has a spider-like shape, and which is coaxial with armature 40 along axis 15, has a washer-shaped insulation ring 72, that backs up a plurality of L-shaped commutator bars 74 that are bonded to ring 72. Bars 74 are equally spaced in a peripheral direction about axis 15 and are preferably made of printed-circuit, metal-foil strips.

Figure 3:
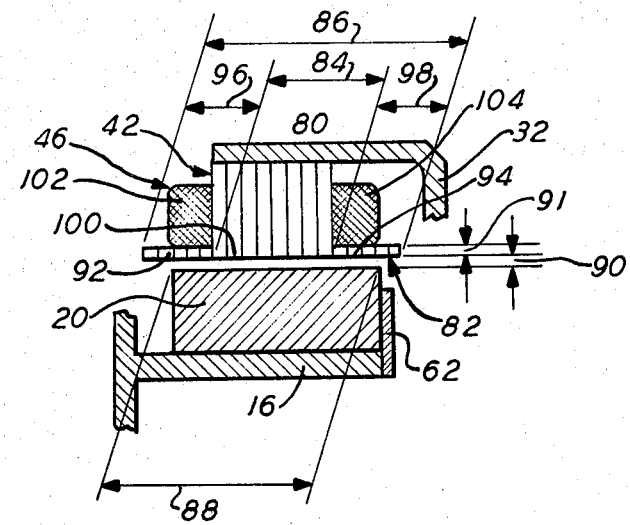
FIG. 3 is an enlarged view of a portion of FIG. 1.

According to the present invention, armature ring 42 has a ring-shaped web portion 80 (FIG. 3) and has a ring-shaped flange portion 82. Web portion 80 has an axial width 84, and flange portion 82 has a respective axial width 86. Flange portion axial width 86 is substantially greater than the web portion axial width 84.

Each of the magnets 20 has substantially the same axial width 88. Magnets 20 form a ring-shaped magnet assembly which has a substantially constant axial width that is equal to axial width 88. The assembly of magnets 20 are separated from the ring-shaped flange portion 82 by a substantially constant radial gap 90, which is cylindrical in profile. Flange 82 has a thickness 91, which is preferably greater than gap 90.

Flange portion 82 has axially opposite projecting portions 92, 94, which have respective axial widths 96, 98 that extend beyond web portion 80. Flange 82 has an intermediate portion 100 which is disposed between projecting portions 92, 94 and which is substantially equal in width to axial width 84. Coils 46 have axially opposite portions 102, 104, which are supported by respective flange portions 92, 94. Coil portions 102, 104 are smaller in axial width than the adjacent flange portions 92, 94.

Projection width 96 is preferably equal to projection width 98. Width 96 or 98 is preferably about equal to 0.25 of flange width 86 and is preferably a maximum of about 0.40 of flange width 86. The axial width 88 of the ring-shaped assembly of magnets 20 is preferably substantially greater than the axial width 84 of web 80. The magnet width 88 is about equal to the flange width 86, and is preferably slightly greater than the flange width 86.

Flange thickness 91 is preferably smaller than projection width 96 or 98. Flange thickness 91 is preferably about 0.25 of projection width 96 or 98.

Figure 2:
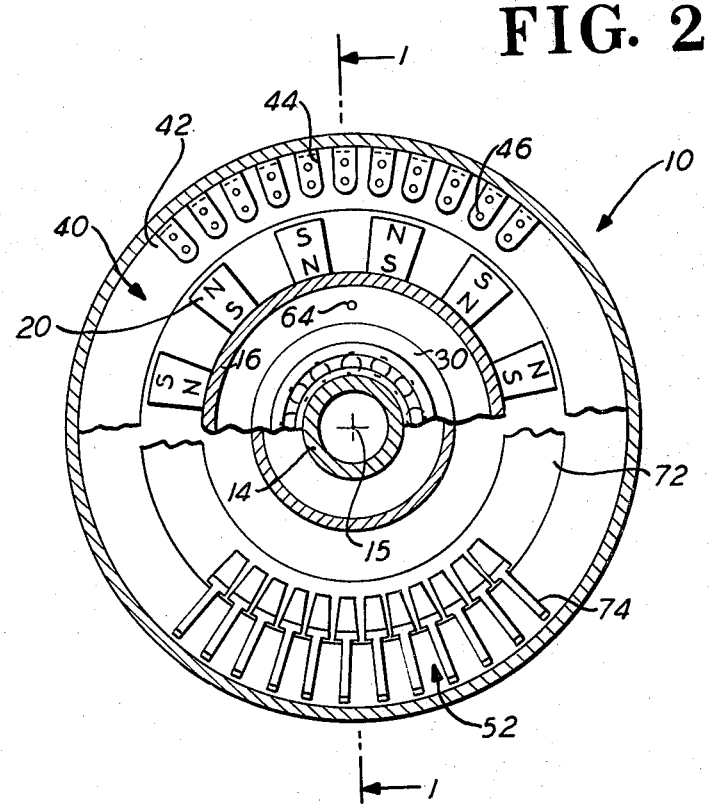
FIG. 2 is a sectional view taken along the line 2—2 of FIG. 1.

Each slot 44 of FIG. 2 has a radial depth of substantially equal size. The slot radial depth is preferably slightly smaller in dimension than the radial thickness of armature ring 40 minus the armature ring flange thickness 91. Each slot 44 also has a slot width, measured in a peripheral direction at the radially outer edge of slot 44. Slot peripheral widths are preferably of equal size. Each pair of adjacent slots 44 form an armature pole which has a pole thickness that is measured in a peripheral direction at the radially outer edge thereof. The width of each slot measures between 0.20 to 0.50 times slot depth, and preferably measures about 0.35 times slot depth. Tooth thickness 110 measures between 0.20 to 0.80 times the slot width and preferably measures about 0.50 times slot width.

The manufacture of torquer 10 is facilitated because flange projecting portion 92 extends beyond coil projecting portion 102 thereby permitting the placement of a magnetizing fixture in contact with flange projecting portion 92. In this way, the assembly of magnets 20 can be axially displaced from the magnetizing fixture into the armature ring 42, while maintaining during such displacement substantially the same gap thickness as the finished gap thickness 90, thereby minimizing the loss in magnetic charge in the assembly of magnets 20. Therefore, a torquer can be provided wherein not only the ratio of torque outpput to power input for a given torquer size is maximized, but also wherein the torquer has an assembly of magnets formed as a magnetic ring which is substantially fully saturated.

In order to make maximum use of the torquer housing inner envelope space, the cross sectional area of the flange projecting portions 92, 94 is minimized. The flange thickness 91 is minimized, and the ratio of flange thickness 91 to flange projecting portion axial width 96 or 98 is minimized. Flux lines, which flow from magnet 20 into and normal to flange projecting portion 92, 94, turn substantially at 90° and flow axially inwardly through the flange projecting portions 92, 94 into web portion 80. At the juncture of the flange projecting portion 92 or 94 and the face of web portion 80, there is a maximum concentration of flux lines. In order to prevent saturation of the flux lines at this juncture, the flange thickness 91 at this juncture is selected to be just large enough to prevent saturation. Such selection depends on the saturation factor constant of the material of flanges 92, 94 and of web 80. The material of flanges 92, 94 and web 80 is preferably vanadium permendur, or like material, wherein the saturation factor constant is between 20-22 kilogauss. In this way, a torquer is provided, wherein not only the torquer magnetic ring 20 is substantially fully saturated after assembly, but also wherein the armature ring 42 does not become over-saturated due to the quantity of magnetic flux lines emanating from the magnetic ring 20.

In summary, the present invention provides a torquer, wherein the ratio of torquer output to power input for a given torquer size is maximized, wherein the torquer has a magnet ring which is substantially fully saturated after assembly within the armature ring, and wherein the armature ring does not become over-saturated due to the flux from the magnet ring.

Figure 4:
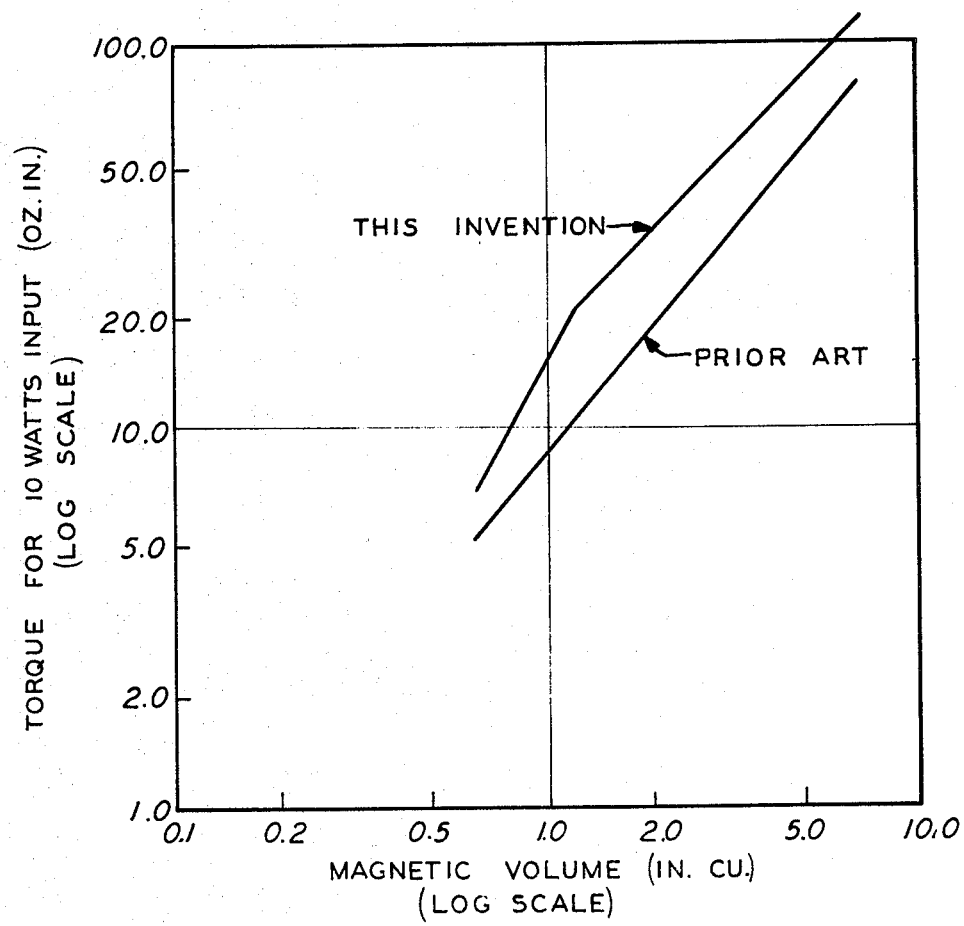
FIG. 4 is a graph which compares the power output of the prior art torquer with the power output of a torquer embodying features according to the present invention.

Experimental data was obtaied on a number of experimental torquer units, which were constructed according to the details of torquer 10 and which embodied the features of the present invention. The experimental data for the experimental torquer units according to this invention is shown in the graph of FIG. 4. Experimental data was also obtained on a number of torquer units which were constructed according to the details of the prior art. The experimental data for the prior art torquer units is also shown in the graph of FIG. 4 for comparison with the experimental data of this invention.

The Y-coordinate scale of the graph of FIG. 4 indicates the measured output torque, in ounce-inches, at a substantially constant power input of about 10 watts.

The X-coordinate scale of the graph of FIG. 4 shows an arbitrary parameter which is the magnetic volume of the torquer parts. The magnetic volume of the torquer parts, which is in cubic inches, is equal to the area of the respective cross-sections times the respective circumferential lengths of the torquer parts. The torquer parts include magnet 20, web 80, flange 82, and coils 102, 104, Such magnetic volume is slightly less than the available volume in the inner envelope between walls 16, 32 of torquer 10. The parameter of magnetic volume is a useful measure of the torquer size.

The graph of FIG. 4 compares the power output of a torquer according to this invention with the power output of a torquer according to the prior art at each torquer size over a relatively large range of torquer sizes. The graph of FIG. 4 shows that the power output for a given size torquer according to this invention is about between 50% to 100% greater than the power output of the same size torquer according to the prior art.

While the present invention has been described in a preferred embodiment, it will be obvious to those skilled in the art that various modifications can be made therein within the scope of the invention. For example, the coil-wound armature ring can be mounted

What is claimed is:

1. A D.C. torquer comprising:
a permanent magnet ring having a longitudinal axis and having a plurality of magnetized poles peripherally spaced about said axis,
a pair of brushes mounted on said magnetic ring;
a one-piece armature ring rotatable relative to said magnet ring about said axis and having a plurality of coils mounted thereon defining a corresponding plurality of coil-wound poles peripherally spaced about said axis, said armature ring having a plurality of slots disposed between said poles, said armature poles being separated from said magnet poles by a substantially constant gap; and
a commutator ring mounted on said armature ring and disposed coaxially with said armature ring and said magnet ring to be contacted by said brushes, wherein:
said armature ring has a ring-shaped web portion and a ring-shaped flange portion, said armature web portion and said armature flange portion having selected axial widths, said armature flange portion axial width being substantially greater than said armature web portion axial width; said magnet ring has a selected axial width substantially greater than said armature web portion axial width and approximately equal to said armature flange portion axial width; said armature flange portion has axially opposite projecting portions extending beyond said web portion and having respective axial widths of substantially equal size, said axial width of each flange projecting portion being not greater than 0.4 times the overall armature flange portion axial width; each said armature coil has a coil portion projecting axially beyond the face of said armature web portion; and each said armature flange projecting portion extends axially beyond said armature coil portion disposed adjacent thereto.

2. The D.C. torquer as claimed in claim 1, wherein each said flange projecting portion has a flange thickness of approximately equal size and smaller in dimension than said flange projecting portion axial width, wherein the ratio of armature ring flange thickness to flange projecting portion axial width is selected so that the saturation in the armature ring flange caused by the magnet ring is slightly less than the maximum saturation level of the material of the armature ring.

3. The D.C. torquer as claimed in claim 2, wherein said armature slots have respective radial depths of substantially equal size, the radial depth of each said slot being slightly smaller in dimension than the radial dimension of said armature ring minus said armature ring flange thickness.

4. The D.C. torquer as claimed in claim 3, wherein each said armature slot has a slot width measured in a peripheral direction at the radially outer edge thereof, said armature slot widths being of substantially equal size, each said pair of armature slots forming one said armature tooth therebetween, each said armature tooth having a tooth thickness measured in a peripheral direction at the radially outer edge thereof, said slot width measuring between 0.2 and 0.5 times said slot depth, said tooth thickness measuring between 0.2 and 0.8 times said slot width.

* * * * *